United States Patent [19]
Yoshinaka

[11] Patent Number: 5,465,181
[45] Date of Patent: Nov. 7, 1995

[54] APPARATUS FOR RECORDING AND REPRODUCING A DIGITAL/VIDEO SIGNAL HAVING A REDUCED NUMBER OF PROCESSING CHANNELS

[75] Inventor: Tadaaki Yoshinaka, Kanagawa, Japan

[73] Assignee: Sony Corporation, Tokyo, Japan

[21] Appl. No.: 210,780

[22] Filed: Mar. 18, 1994

Related U.S. Application Data

[63] Continuation of Ser. No. 932,504, Aug. 20, 1992, abandoned.

[30] Foreign Application Priority Data

Aug. 30, 1991 [JP] Japan .................... 3-246794

[51] Int. Cl.$^6$ .................................................. H04N 5/78
[52] U.S. Cl. .................... 360/36.2; 360/64; 360/33.1
[58] Field of Search .................. 360/32, 33.1, 38.1, 360/36.2, 64; 358/310

[56] References Cited

U.S. PATENT DOCUMENTS

| | | | |
|---|---|---|---|
| 4,463,387 | 7/1984 | Hashimoto et al. | 360/33.1 X |
| 4,473,850 | 9/1984 | Foerster et al. | 360/33.1 X |
| 4,636,873 | 1/1987 | Eguchi | 360/64 X |
| 4,716,565 | 12/1987 | Suma | 360/38.1 X |
| 5,301,070 | 4/1994 | Tanaka | 360/64 X |

FOREIGN PATENT DOCUMENTS

| | | |
|---|---|---|
| 407046 | 1/1991 | European Pat. Off. . |
| 3805438 | 8/1989 | Germany . |
| 3936994 | 5/1991 | Germany . |

*Primary Examiner*—Andrew L. Snizezek
*Attorney, Agent, or Firm*—Jay H. Maioli

[57] ABSTRACT

A total of eight magnetic heads are attached to a rotary drum in a manner such that the magnetic heads of four channels are spaced apart from the other magnetic heads of four channels by an interval of 180°. A magnetic tape is wrapped around the peripheral surface of the rotary drum in a range of 270°. The channels are repaired off and time divisionally multiplexed so that four signals are formed. Those signals are subjected to digital recording processes by the circuit blocks. Recording data of eight channels having phases which coincide with the recording phases of magnetic heads is produced by the FIFO memories on the output side.

3 Claims, 7 Drawing Sheets

APPARATUS FOR RECORDING AND REPRODUCING A DIGITAL/VIDEO SIGNAL HAVING A REDUCED NUMBER OF PROCESSING CHANNELS

This is a continuation of application Ser. No. 07/932,504 filed Aug. 20, 1992 now abandoned.

BACKGROUND OF THE INVENTION

1. Field of the Invention

The invention relates to a recording and reproducing apparatus of a digital video signal and, more particularly, to a digital VTR using rotary heads and a magnetic tape.

2. Description of the Prior Art

In a conventional analog VTR, a pair of magnetic heads are attached to a rotary drum at an angular interval of 180° and a magnetic tape is wrapped around the peripheral surface of a drum in a range of about 180°. The magnetic tape is fed at a predetermined speed. The magnetic heads alternately scan on the magnetic tape, so that a video signal is recorded as an oblique track. Since the wrap angle of the tape is set to about 180° as mentioned above, periods during which the magnetic heads scan on the tape don't overlap with respect to time. Therefore, it is sufficient to provide one system of recording and reproducing circuits and the circuit scale doesn't increase.

In a digital VTR for recording and reproducing a video signal in a form of the digital signal, the amount of data represented by the digital video signal is large. Therefore, a multichannel method of simultaneously forming a plurality of tracks by one scan of the magnetic head is generally used. With respect to the digital VTR, the case where tape wrap angle is set to 180° and the case where it is set to 270° will now be compared and examined. As an example, the case where data of 600 Mbps is recorded by the magnetic heads of total eight channels in which the magnetic heads of four channels face the other heads of the other four channels will now be considred. Each parameter in the above case can be calculated as follows.

| Drum rotational speed | 150 rotations/sec | |
|---|---|---|
| Tape wrap angle | 180° | 270° |
| Recording rate/CH | 150 Mbps | 100 Mbps |
| Relative speed | 52.5 m | 35 m |
| Drum diameter | 111.5 mm | 74.3 mm |

When the wrap angle is increased as mentioned above, the drum diameter can be reduced. Accordingly, not only the size and weight of the apparatus can be reduced but also spacing loss can be reduced and the tape damage can be decreased because of decrease in relative speed. Moreover, movable heads can be easily installed due to decrease in centrifugal force. Further, since the recording data rate is lowered, efficiencies of the rotary transformer and magnetic heads rise and it is advantageous from the viewpoint of a high density recording. The conventional digital VTR in which a wrap angle is set to 270° will now be described. FIG. 1 shows a circuit construction for recording. A luminance signal Y and color difference signals PB and PR as components of a color video signal are converted into digital signals by A/D converters 1, 2, and 3. A sampling clock $CK_1$ which is supplied to the A/D converter 1 has a frequency $F_s$ of, for instance, 37.5 MHz. A frequency of sampling clock which is supplied to the A/D converters 2 and 3 is set to ½ of $F_s$. Therefore, the data amount of the digital color difference signals from the A/D converters 2 and 3 is the half of that of the luminance signal. A sampling rate of the total data of the digital data from the A/D converters 1, 2, and 3 is equal to $2 F_s$.

Output signals of the A/D converters 1 to 3 are supplied to a head interleave circuit 4. As shown in FIG. 2, eight magnetic heads 14A to 14H are attached to a drum 13 which rotates at 150 Hz (which is five times as high as a frame frequency). A magnetic tape 15 is obliquely wrapped around the peripheral surface of the drum 13 at a wrap angle θ (for example, θ=270°). The magnetic heads 14A, 14B, 14C, and 14D are closely arranged. Four tracks are simultaneously formed on the magnetic tape 15 by the four magnetic heads. The four magnetic heads 14E to 14H are closely attached to the drum 13 so as to have an angular interval at 180° from the magnetic heads 14A to 14D. Four tracks are simultaneously formed on the magnetic tape 15 by the magnetic heads 14E to 14H. Although not shown, the magnetic tape 15 is fed at a predetermined speed by a tape feeding mechanism.

To form data which is recorded by each magnetic head, the head interleave circuit 4 in FIG. 1 distributes the digital component signal to signals of eight channels of "A" to "H". In FIG. 3, as shown in S1, output signals of the head interleave circuit 4 are parallel data of eight channels. A sampling frequency of each channel is set to ($2 F_s/8=¼ F_s$). The signal of the channel "A" is supplied to an encoder 5 of an outer code. As a countermeasure for errors which occur during the recording and reproducing processes, the data is error correction encoded by both of an outer code and an inner code. More practically speaking, the encoding of the outer code is executed with respect to the vertical direction of a matrix-like array of the data of a predetermined amount. The encoding of the inner code is executed with respect to the lateral direction of such a data array every sync block.

Output data of the encoder 5 is supplied to a shuffling circuit 6. The shuffling circuit 6 executes a shuffling to rearrange the data of one channel in one field to an order different from the original order and is constructed by a memory. The shuffling prevents that the data which is continuous with respect to time becomes an error in a lump due to a burst error, thereby enabling a good error concealment to be performed. A write clock CKW and a read clock CKR are supplied to the shuffling circuit 6. A desired shuffling is performed by an address control of the memory. Further, a frequency of clock CKW is set to ¼ $F_s$ and a frequency of clock CKR is set to ⅓ $F_s$. Consequently, output data of the shuffling circuit 6 is time-base compressed to ¾ of the input data. Further, the reading timing of the data from the shuffling circuit 6 is made to coincide with a phase at which the corresponding magnetic head of the channel "A" records the data onto the magnetic tape.

The output signal of the shuffling circuit 6 is supplied to an ID adding circuit 7 and an ID signal for control is added. An output signal of the ID adding circuit 7 is supplied to an inner code encoder 8 and the encoding of the inner code is executed. An output signal of the inner code encoder 8 is supplied to a sync adding circuit 9. Recording data is partitioned by a sync block. Video data in the sync block, a parity of an error correction code, and the ID signal are encoded by the inner code. Recording data of a structure of the sync block is generated from the sync adding circuit 9 and the recording data is supplied to a channel encoder 10. The channel encoder 10 executes a channel encoding to reduce a DC component. An output signal of the channel encoder 10 is supplied to a parallel/serial converting circuit 11. Serial recording data is supplied from the parallel/serial converting circuit 11. The recording data is supplied to the magnetic head 14A through a recording amplifier (not shown).

A circuit construction regarding the channel "A" from the outer code encoder 5 to the parallel/serial converting circuit 11 as mentioned above is provided with respect to the other channels of "B" to "H" as shown in blocks 12B to 12H of broken lines. The recording data from the blocks 12B to 12H is supplied to the magnetic heads 14B to 14H through recording amplifiers, respectively. The time-base compression is executed by the shuffling circuit 6 and the shuffling circuits in the circuit blocks 12B to 12H and the timing for reading out the data from the memory is made coincident with the recording phase of the corresponding magnetic head. Therefore, as outputs of the shuffling circuit 6 and the shuffling circuits of the circuit blocks 12B, 12C, and 12D, data S2 in FIG. 3 is generated. As outputs of the shuffling circuits of the circuit blocks 12E, 12F, 12G, and 12H, data S3 in FIG. 3 is generated.

In FIG. 3, T denotes a period (=1/150 second) of one rotation of the drum 13 and the wrap angle θ (FIG. 2) is set to 270°. Therefore, the recording data of the channels "A" to "D" is recorded as four tracks for a period of time when the magnetic heads 14A to 14D scan the magnetic tape 15. The recording data of the channels "E" to "H" is subsequently recorded as four tracks for a period of time when the magnetic heads 14E to 14H scan the magnetic tape 15 with a delay time of ½ T.

A conventional reproducing circuit to reproduce the data recorded as mentioned above will now be described with reference to FIG. 4. The reproduction data of the channels "A" to "H" is supplied to decoders (not shown) of channel codes through reproducing amplifiers by the magnetic heads 14A to 14H. The reproduction data of the channel A from the decoder of the channel code is supplied to a PLL 21. The PLL 21 extracts clocks necessary for a process of the reproducing circuit from the reproduction data. An output signal of the PLL 21 is supplied to a serial/parallel converting circuit 22. An output signal of the serial/parallel converting circuit 22 is supplied to a TBC (time base compensator) 23 and a time base fluctuation component in the reproduction data is eliminated.

An output signal of the TBC 23 is supplied to an inner code decoder 24 and an error correction by an inner code is executed. An output signal of the decoder 24 is supplied to a deshuffling circuit 25. The deshuffling circuit 25 is constructed by a memory. The write clock CKW and read clock CKR are supplied to the deshuffling circuit 25. A frequency of the clock CKW is set to ⅓ $F_s$, which is equal to the clock rate of the reproduction data. A frequency of the clock CKR is set to ¼ $F_s$. By the address control, the deshuffling circuit 25 executes a process to return the shuffling in the recording mode to the original arrangement. In addition to such a process, the deshuffling circuit executes a time base expanding process according to a frequency ratio of the clocks. Further, since the read-out phases of the channels "A" to "D" are controlled, parallel data of eight channels is formed.

An output signal of the deshuffling circuit 25 is supplied to an outer code decoder 26, by which an error correcting process by an outer code is executed. An output signal of the outer code decoder 26 is supplied to a head deinterleave error concealment circuit 28. In the circuit 28, the data of eight channels is separated into a luminance signal and two color difference signals and errors which cannot be corrected by the inner code and outer code are corrected. D/A converters 29, 30, and 31 are connected to the circuit 28. The digital luminance signal is converted into the analog luminance signal Y by the D/A converter 29. The digital color difference signals are converted into the color difference signals PB and PR by the D/A converters 30 and 31, respectively.

The same construction as that of the reproducing circuit from the PLL 21 to the outer code decoder 26 with respect to the channel "A" mentioned above is provided with regard to each of the other channels "B" to "H" as shown in blocks 27B to 27H of broken lines in FIG. 4. As output of the serial/parallel converting circuit 22 and serial/parallel converting circuit in the circuit blocks 27B to 27H, reproduction data indicated by S4 in FIG. 5 is generated. The reproduction data S4 corresponds to the reproducing phase of the magnetic head. As an output of the outer code decoder 26 and outputs of outer code decoders in the circuit blocks 27B to 27H, parallel reproduction data of eight channels of "A" to "H" as shown by S5 in FIG. 5 is generated.

In the above digital VTR, the wrap angle θ of the magnetic tape 15 is set to 270° (larger than 180°). In the digital VTR, in the case where a recording wavelength is constant and a drum rotational speed and the number of recording heads are specified, by increasing θ to a value larger than 180°, a diameter of the drum 13 can be reduced or a length of track can be increased and a recording frequency can be reduced. However, an interval during which the scans of the magnetic heads overlap occurs. As shown in FIG. 1 or 4, consequently, there is the problem that it is necessary to provide in parallel a number of signal processing systems which is equal to the number of magnetic heads (channels) thereby enlarging the scale of the recording circuit and the reproducing circuit.

OBJECTS AND SUMMARY OF THE INVENTION

It is, therefore, an object of the invention to provide a recording and reproducing apparatus of a digital video signal which can reduce the scale of a recording circuit and a reproducing circuit even when the tape wrap angle is large.

According to the present invention, there is provided a recording apparatus for recording a digital video signal onto a magnetic tape by N magnetic heads attached to a rotary drum, in which the magnetic tape is wrapped around the peripheral surface of the rotary drum in an angular range where the scans of the magnetic heads overlap, the recording apparatus comprising:

a circuit to distribute the input digital video signal to a number of channels which is smaller than the number N of heads;

digital recording processing circuits which are connected to the channels and include encoders of error correction codes; and memory circuits equal in number to the number N of heads, in which those memory circuits are coupled to the digital recording processing circuits and the reading operation from the memory circuit are executed so as to match with a recording phase of each of the magnetic heads and N recording signals are generated from the memory circuits.

According to the invention, there is also provided a reproducing apparatus for reproducing a digital video signal from a magnetic tape by N magnetic heads attached to the rotary drum, in which the magnetic tape is wrapped around the peripheral surface of the rotary drum in an angular range where the scans of the magnetic heads overlap, the reproducing apparatus comprising:

a TBC (time base compressor) to which reproduction data of the magnetic heads is respectively supplied and which is used to time-base compress the reproduction data so as to eliminate a time base fluctuation of the reproduction data and to eliminate a time-dependent overlap of the reproduction data;

circuits for synthesizing output data of the TBC and forming reproduction data of the number which is smaller than the number N of heads; and digital reproduction signal processing circuits which are respectively coupled to the synthesizing circuits and include decoders of error correction codes.

According to the invention, the recording video signal is distributed to a number of channels smaller than the number of heads, digital recording processing circuits equal in number to the number of channels are provided, and recording data in a number of channels equal to the number of heads is formed on the output side of the recording processing circuits. Therefore, the number of systems of the digital recording processing circuits can be reduced and the scale of the circuitry can be reduced as compared with the case of providing a number of recording processing circuits equal to the number of heads.

According to the invention, the reproduction data from a plurality of magnetic heads is supplied to the TBC, the time base fluctuation component is eliminated by the TBC, and the time-dependent overlap of the reproduction data is also eliminated. Therefore, the reproduction data can be synthesized from the reproduction data of a number of channels smaller than the number of magnetic heads. After completion of the synthesis, the reproducing process such as error correction or the like can be executed. Thus, the scale of the circuitry can be reduced as compared with the case of providing the reproducing processing circuit in a number channels equal to the number of heads.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
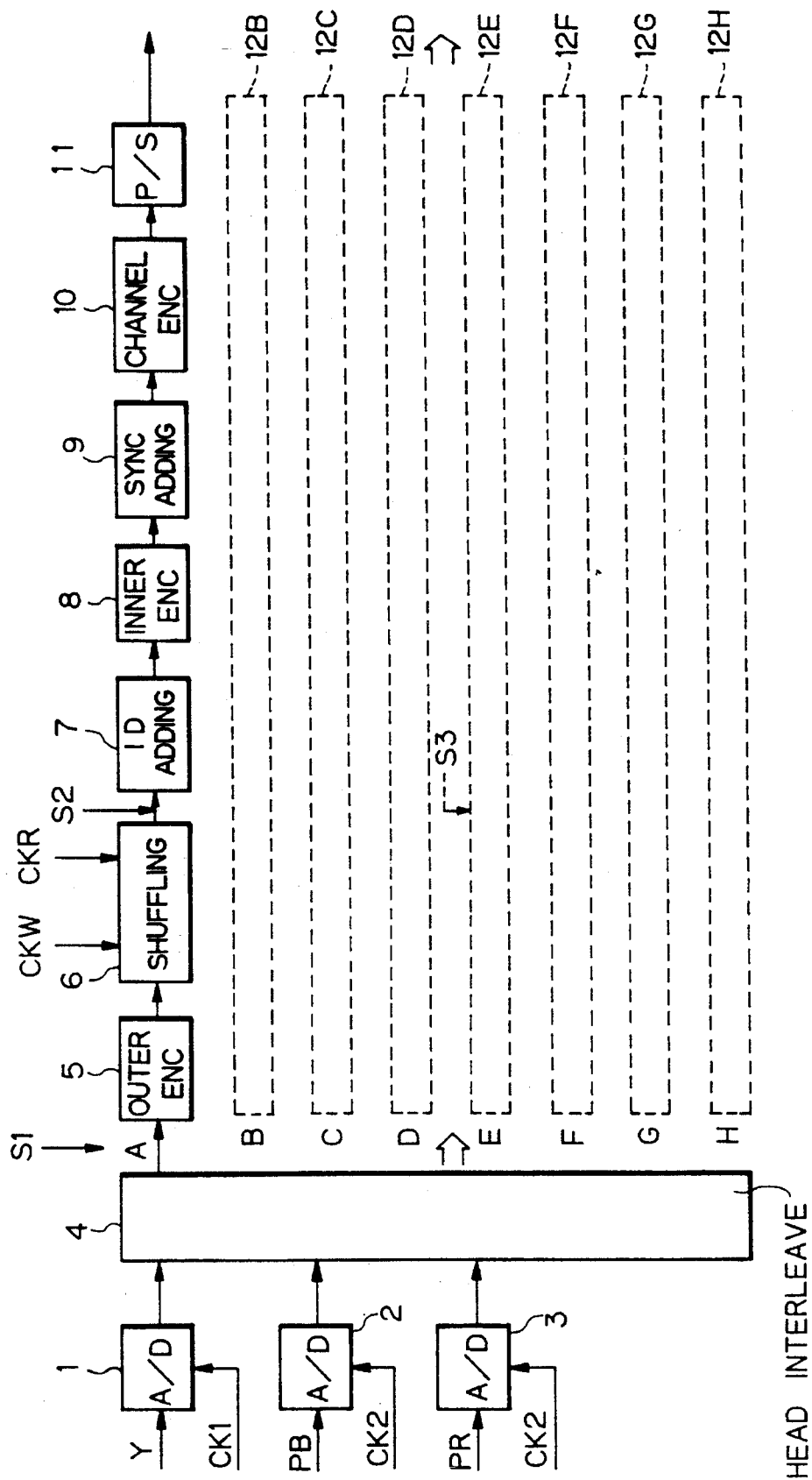
FIG. 1 is a block diagram showing a circuit construction for recording in a conventional digital VTR.
Figure 2:
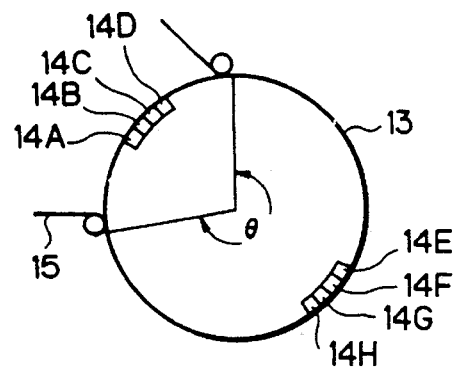
FIG. 2 is a schematic diagram showing a head arrangement of a digital VTR.
Figure 3:
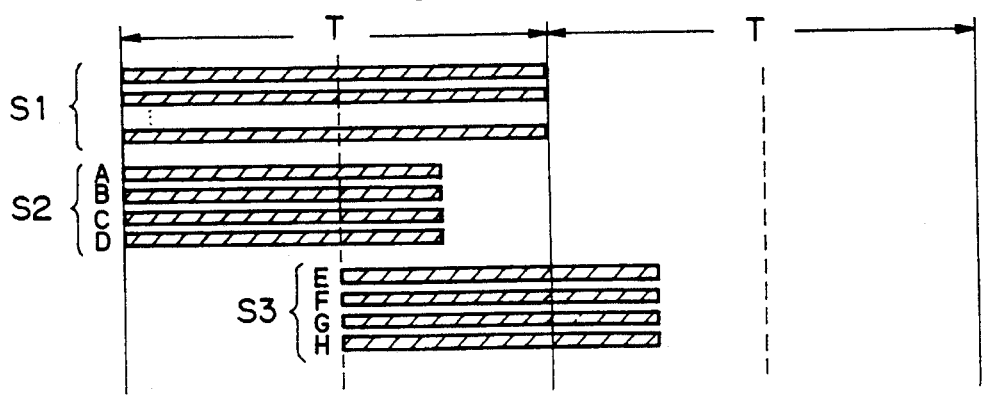
FIG. 3 is a timing chart which is used to explain the operation in the recording mode of a conventional VTR.
Figure 5:
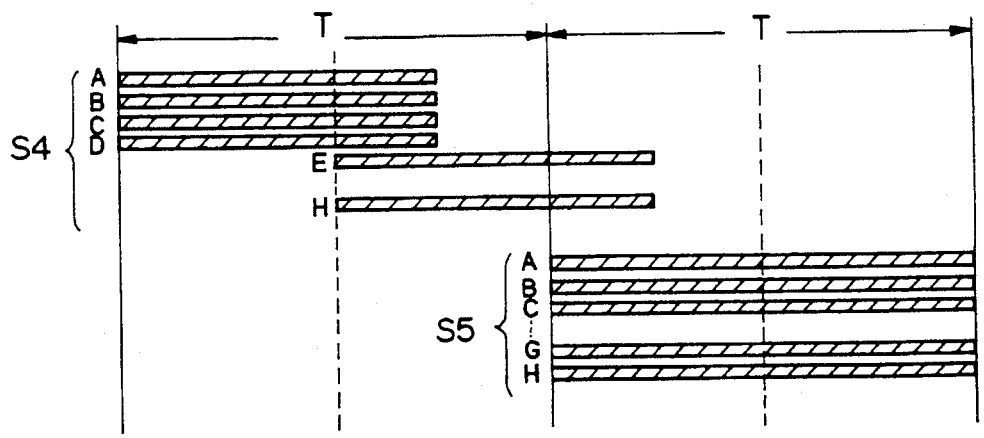
FIG. 5 is a timing chart which is used to explain the operation in the reproduction mode in the conventional VTR.
Figure 4:
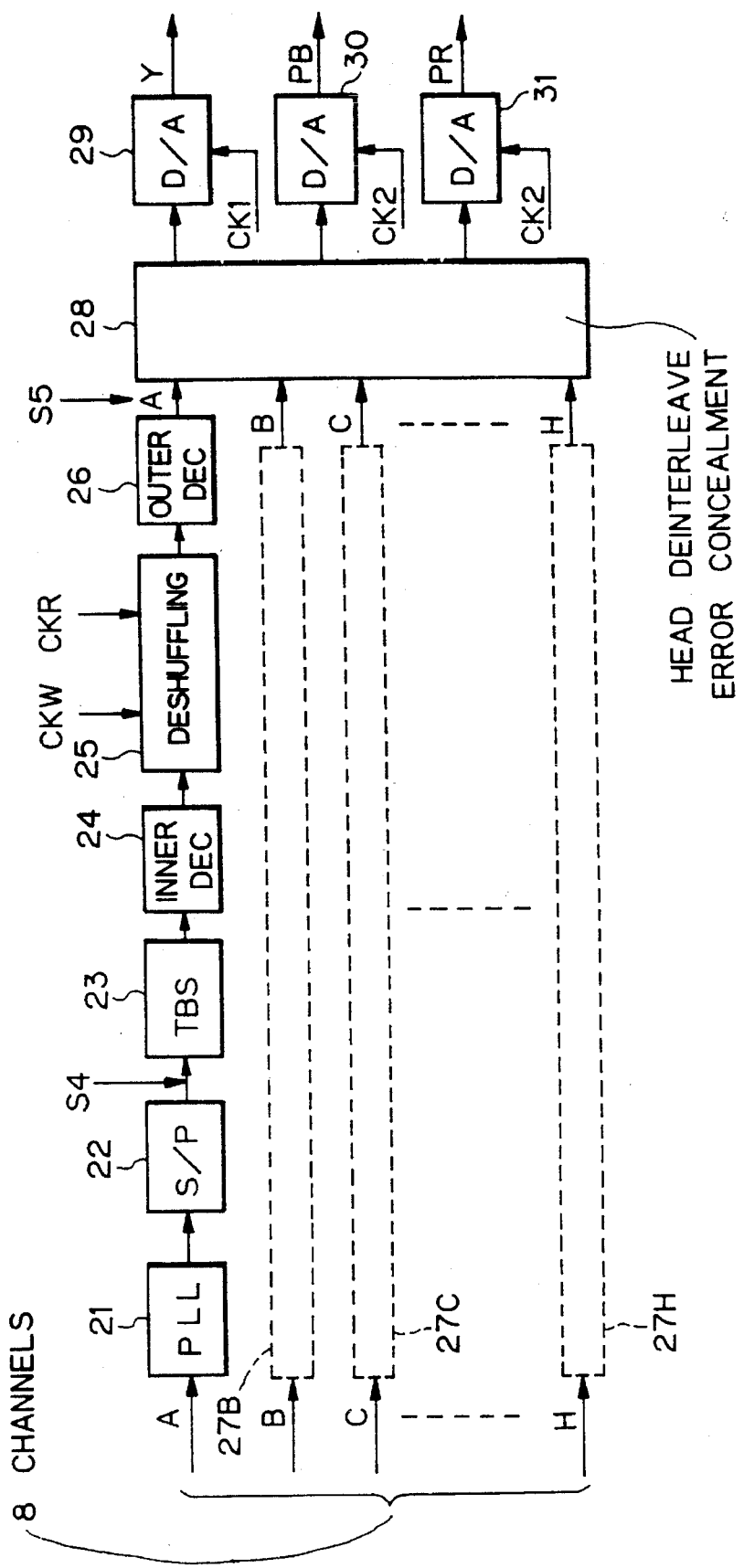
FIG. 4 is a block diagram showing a circuit construction for reproduction in the conventional digital VTR.

An embodiment of the invention will be described hereinbelow with reference to the drawings. In the embodiment, in a manner similar to FIG. 2, eight magnetic heads are attached to a drum which rotates at 150 Hz, every four magnetic heads among them are closely arranged, and an angular interval of 180° is provided between four of the heads and the other four heads. The magnetic tape is wrapped around the peripheral surface of the drum in a range of $\theta$ (=270°).

Figure 6:
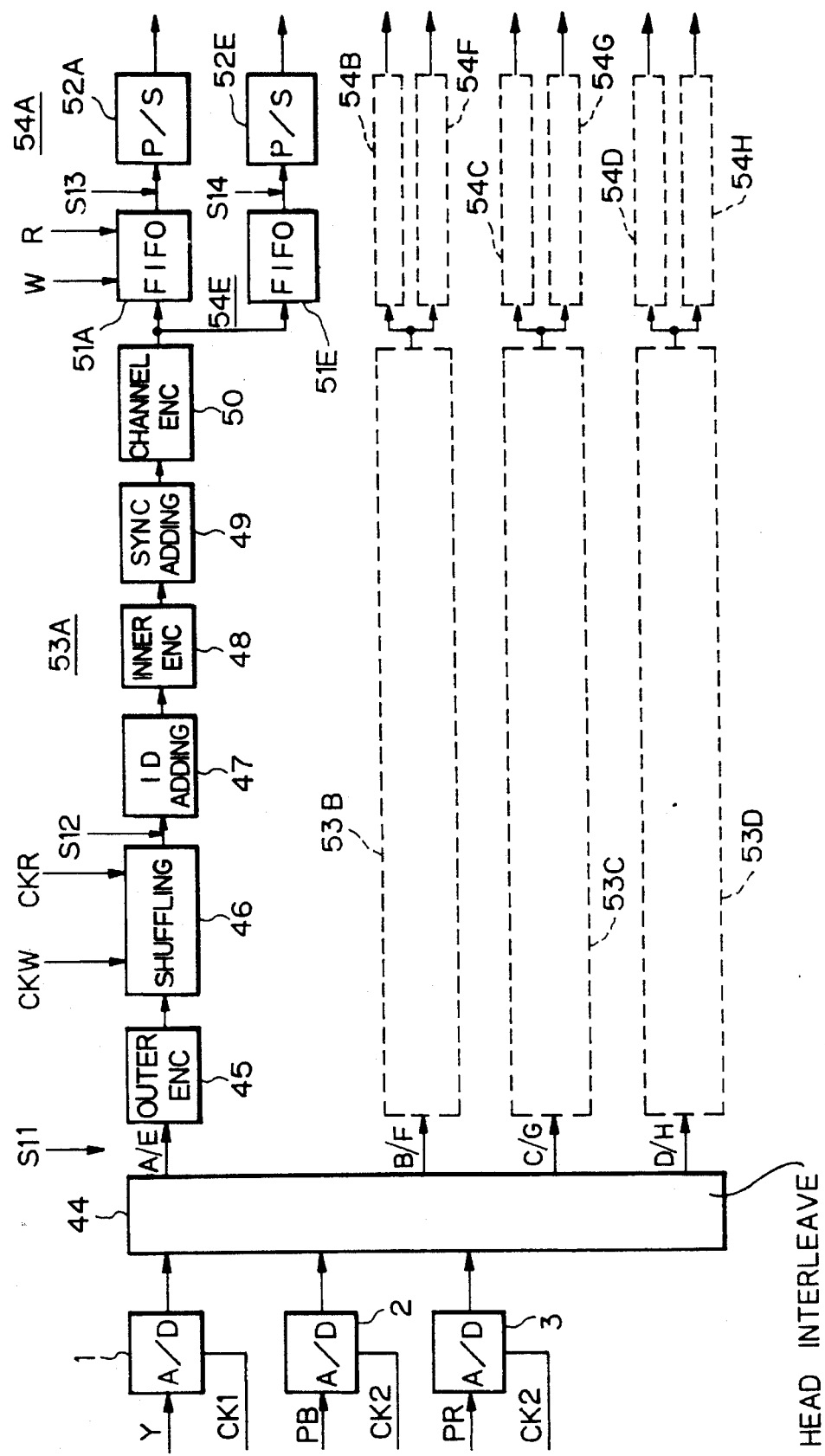
FIG. 6 is a block diagram of a circuit employed in a preferred embodiment of recording apparatus constructed in accordance with the invention.
Figure 7:
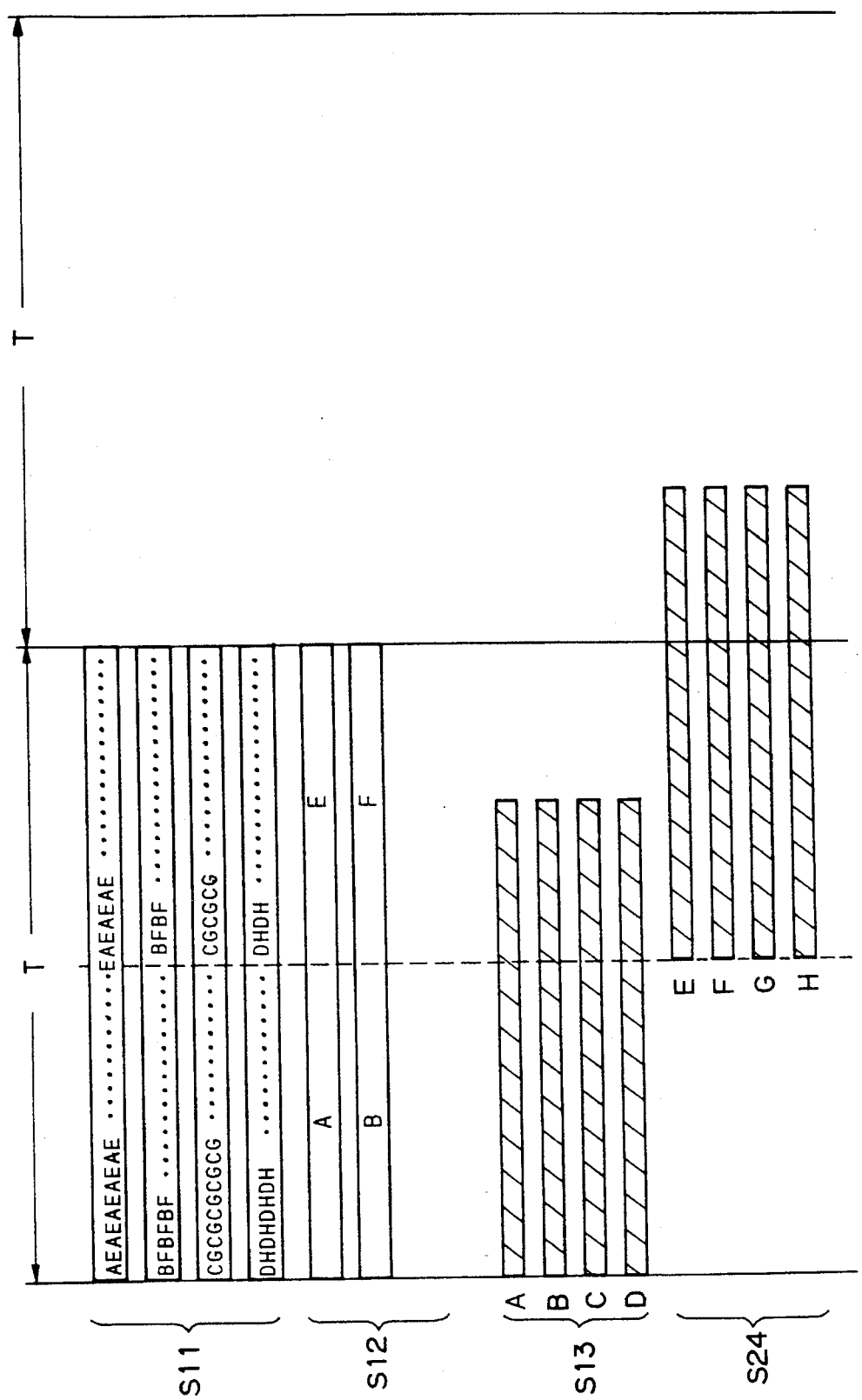
FIG. 7 is a timing chart which is used to explain the operation of the apparatus of FIG. 6.

FIG. 6 shows a construction of a recording circuit of an embodiment. The luminance signal Y and color difference signals PB and PR are converted into the digital signals by the A/D converters 1, 2, and 3, respectively. A frequency of sampling clock CK1 is set to $F_s$ (for instance, 37.5 MHz). A frequency of sampling clock CK2 is set to ½ $F_s$. The digital component signals are supplied to a head interleave circuit 44. The head interleave circuit 44 generates four time division multiplex signals (clock rate is equal to ½ $F_s$). One of them is the time division multiplex signal in which a sample (or a few samples) which is recorded as "A" and "E" channels is alternately included. The other time division multiplex signals are the time division multiplex signal of "B" and "F" channels, time division multiplex signal of the "C" and "G" channels, and time division multiplex signal of "D" and "H" channels. The channels which are time divisional multiplexed correspond to a pair of magnetic heads which are separated by an angular interval of 180°. In FIG. 7, S11 denotes four time division multiplex signals which are generated from the head interleave circuit 44. Although the video data is continuously supplied, FIG. 7 shows processes of only the video data that is supplied for the period T for simplicity of explanation.

The time division multiplex signal of the "A" and "E" channels is supplied to a shuffling circuit 46 through an outer code encoder 45. To correct errors which occur during the recording and reproducing processes, error correction codes by both of an outer code and an inner code are used. To distribute a burst error, the shuffling circuit 46 executes a shuffling to rearrange, for instance, the order of data in one field. The shuffling circuit 46 is constructed by a memory. The write clock CKW and read clock CKR are supplied to the shuffling circuit 46. Frequencies of clocks CKW and CKR are equal to ½ $F_s$. In the shuffling circuit 46, the signal which has been time division multiplexed on a sample unit basis is converted into a signal S12 such that data to be recorded as a channel "A" exists in the former half of the period T and data to be recorded as a channel "E" exists in the latter half of the period T.

An ID signal for control is added to an output signal of the shuffling circuit 46 by an ID adding circuit 47. An output signal of the ID adding circuit 47 is supplied to an inner code encoder 48 and the encoding of the inner code is executed. An output signal of the inner code encoder 48 is supplied to a sync adding circuit 49 and a sync signal is added every sync block. Data of a structure of the sync block from the sync adding circuit 49 is supplied to a channel encoder 50 and a channel encoding process is executed.

An output signal of the channel encoder 50 is supplied to FIFO memories 51A and 51E. Parallel/serial converting circuits 52A and 52E are connected to the FIFO memories 51A and 51E, respectively. Recording data for the magnetic head of the channel "A" is generated from the parallel/serial converting circuit 52A. Recording data the magnetic head of the channel "E" is generated from the parallel/serial converting circuit 52E. A frequency of write clock W for the FIFO memories 52A and 52E is set to ½ $F_s$ and a frequency of read clock R is set to ⅓ $F_s$. The data of the channel "A" of the former half of the period T is written into the FIFO memory 51A and the data of the channel "E" of the latter half of the period T is written into the FIFO memory 51E. Therefore, the time-base expansion is executed by the FIFO memories 52A and 52E and the data existing in the interval of ½ T is expanded to the data existing in the interval of ¾ T.

As shown by broken lines in FIG. 6, circuit blocks 53B, 53C, and 53D similar to a circuit construction 53A from the outer code encoder 45 to the channel encoder 50 mentioned above are also provided for the other three output signals from the head interleave circuit 44. Further, circuit blocks 54B, 54F, 54C, 54G, 54D, and 54H similar to serial connections 54A and 54E of the FIFO memories and parallel/serial converting circuits are connected to those circuit blocks, respectively. Recording data of the channels "B" to "H" is generated from the circuit blocks, respectively. Although not shown, the recording data is supplied to eight magnetic heads through the recording amplifiers, respectively.

As shown in FIG. 7, the signal S12 including the data such that two channels have been distributed respectively to the former half and latter half of the period T of one rotation of the magnetic head is read out from each of the shuffling circuits of the circuit blocks 53A to 53D. Recording data S13 of the channels "A", "B", "C", and "D" which has been time-base expanded and exists in the interval of ¾ T is read out from each FIFO memory in the circuit blocks 54A, 54B, 54C, and 54D. The interval of the recording data S13 coincides with the recording phase at which the magnetic heads of the channels "A" to "D" scan the magnetic tape. The data of those channels is simultaneously recorded as four tracks onto the magnetic tape.

The data of the channels existing in the latter half of the period T is also similarly time-base expanded by the FIFO memories in the circuit blocks 54E, 54F, 54G, and 54H and recording data of the channels "E", "F", "G", and "H" existing in the interval of ¾ T is produced. The interval of the recording data coincides with the recording phase at which the magnetic heads of the channels "E" to "H" scan the magnetic tape. The data of those channels is simultaneously recorded as four tracks onto the magnetic tape. As will be understood from FIG. 6, as for the recording processing circuit, paths (53A to 53D) from the outer code encoder 45 to the channel encoder 50 are parallel paths of four channels and the circuit scale can be further reduced as compared with the conventional construction in which the circuit systems of eight channels are provided in parallel. Preferably, the connecting positions of the FIFO memories are not limited to those in the construction shown in FIG. 6 so long as they are behind the inner code encoder 48.

A reproducing circuit of the embodiment will now be described with reference to FIGS. 8 and 9. Although not shown, the reproduction data of the channels "A" to "H" from eight magnetic heads is supplied to decoders of channel codes through reproducing amplifiers, respectively. The reproduction data of the channel "A" from the channel code decoder is supplied to a PLL 61. The PLL 61 extracts clocks necessary for processes of the reproducing circuit from the reproduction data. An output signal of the PLL 61 is supplied to a TBC (time base compensator) 63 through a serial/parallel converting circuit 62.

The TBC 63 is constructed by a memory. Data is written by clocks of a frequency of ⅓ $F_s$ that is synchronized with the reproduction data and data is read out by stable clocks of ½ $F_s$. Due to this, the time base fluctuation component in the reproduction data is eliminated. Further, in the TBC 63, the time base of data is compressed to ⅔ in accordance with a frequency ratio of clocks. Therefore, the reproduction data of the channel "A" existing in the interval of ¾ T in the period T of one rotation of the magnetic head is compressed to a length of interval of ½ T. Further, the timing to read out the data from the TBC 63 is delayed by a time of T for the input data. An output signal of the TBC 63 is supplied to a switching circuit 72A.

Figure 8:
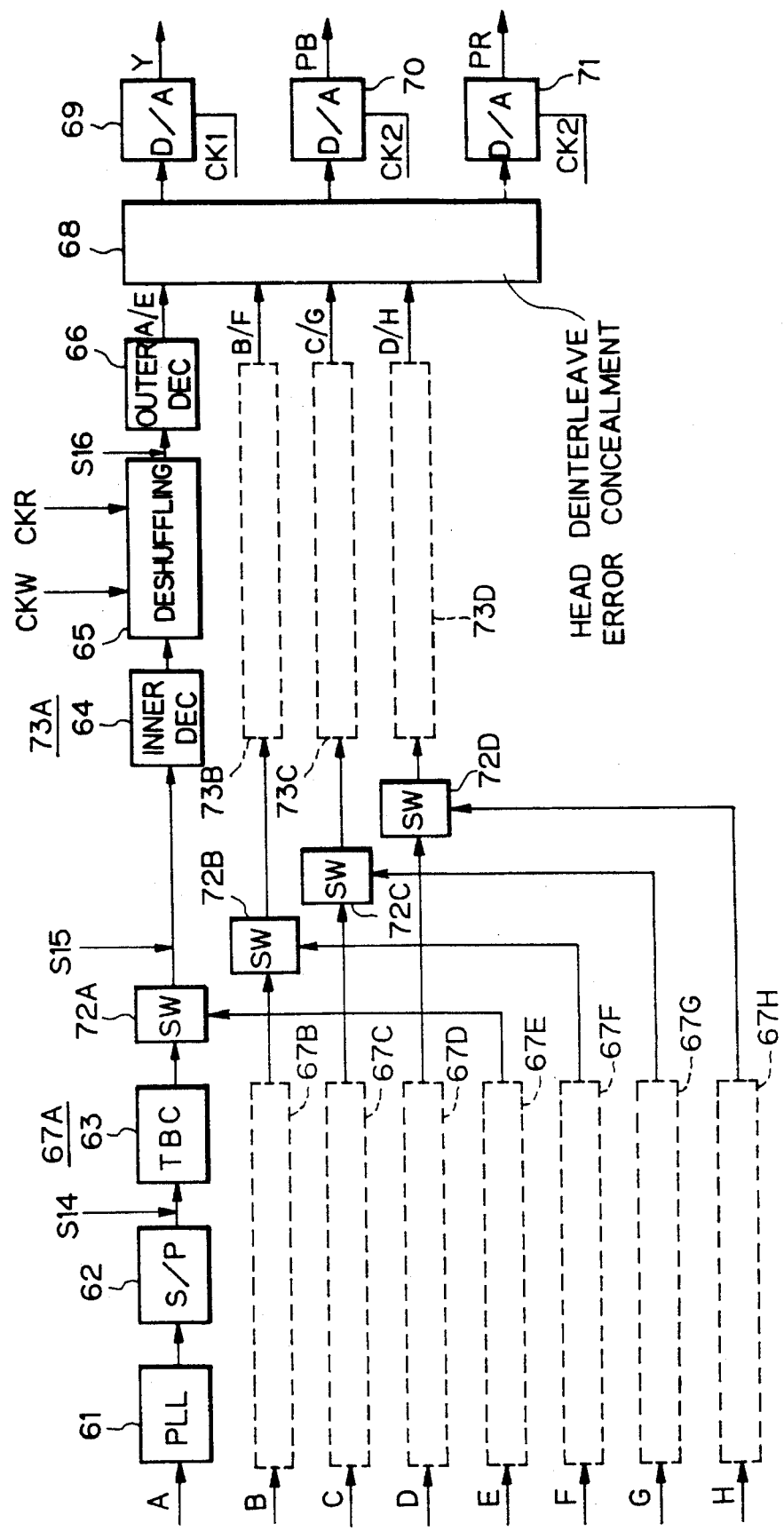
FIG. 8 is a block diagram of a circuit employed in a preferred embodiment of reproducing apparatus constructed in accordance with the invention.

A circuit construction 67A comprising the PLL 61, serial/parallel converting circuit 62, and TBC 63 mentioned above is also provided for each of the reproduction data of the other channels "B" to "H" as shown by blocks 67B to 67H of broken lines in FIG. 8. The reproduction data of the channel "E" from the TBC in the circuit block 67E is supplied to the switching circuit 72A. Reproduction data of the channels "B" and "F" from the circuit blocks 67B and 67F are supplied to a switching circuit 72B. Reproduction data of the channels "C" and "G" from the circuit blocks 67C and 67G is supplied to a switching circuit 72C. Reproduction data of the channels "D" and "H" from the circuit blocks 67D and 67H is supplied to a switching circuit 72D. The switching circuits 72A to 72D are provided to alternately select the reproduction data of two channels which is supplied to them and to produce reproduction data of one channel.

The reproduction data which has been produced by the switching circuit 72A and in which the channels "A" and "E" are located in the former and latter halves of the period T is supplied to an inner code decoder 64 and an error correction by an inner code is executed. An output signal of the decoder 64 is supplied to a deshuffling circuit 65. The deshuffling circuit 65 is constructed by a memory and the write clock CKW and a read clock CKR are supplied to the deshuffling circuit 65. Frequencies of the clocks CKW and CKR are set to ½ $F_s$. By the address control, the deshuffling circuit 65 executes a process to return the shuffling in the recording mode to the original arrangement. Further, the deshuffling circuit forms time division multiplex data in which the data of two channels "A" and "E" is alternately located on a sample unit basis.

An output signal of the deshuffling circuit 65 is supplied to an outer code decoder 66, by which an error correcting process by an outer code is executed. An output signal A/E of the outer code decoder 66 is supplied to a head deinterleave error concealment circuit 68. In the circuit 68, the time division multiplex data of four channels is separated into the luminance signal and two color difference signals and errors which cannot be corrected by the inner code and outer code are concealed. D/A converters 69, 70, and 71 are connected to the circuit 68. The digital luminance signal is converted into the analog luminance signal Y by the D/A converter 69. The digital color difference signals are converted into the analog color difference signals PB and PR by the D/A converters 70 and 71, respectively.

In FIG. 8, circuit blocks 73B, 73C, and 73D shown by broken lines have the same circuit construction as a circuit construction 73A comprising the inner code decoder 64, deshuffling circuit 65, and outer code decoder 66 mentioned above and are connected to the switching circuits 72B, 72C, and 72D, respectively. A time division multiplex signal B/F in which the reproduction data of the channels "B" and "F" is alternately located on a sample unit basis is generated from the circuit block 73B. Similarly, time division multiplex signals C/G and D/H are generated from the circuit blocks 73C and 73D, respectively. Those time division multiplex signals are supplied to the head interleave error concealment circuit 68 and the luminance signal and color difference signals are generated from the circuit 68 as mentioned above.

Figure 9:
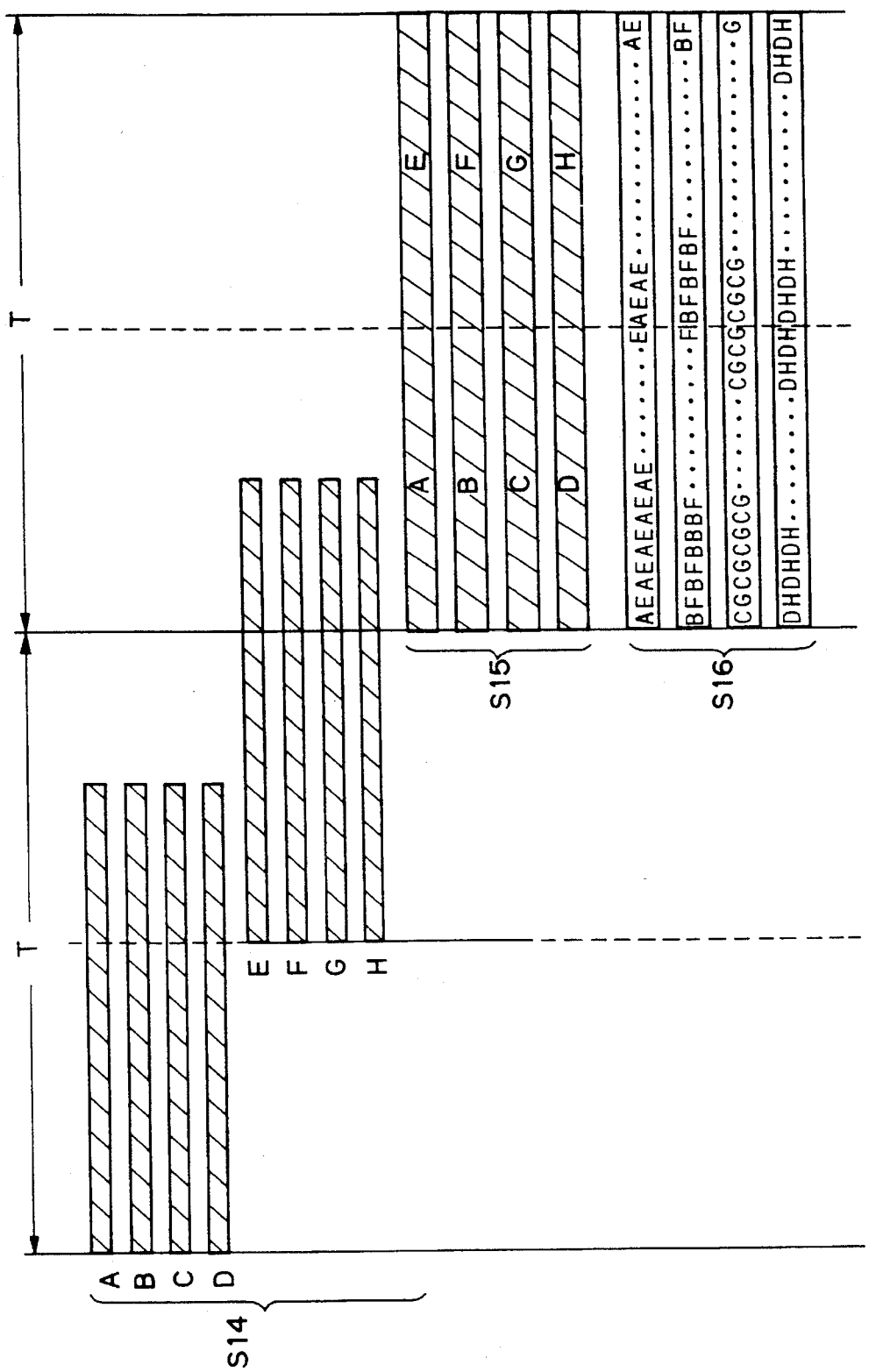
FIG. 9 is a timing chart which is used to explain the operation of the apparatus of FIG. 8.

In the above reproducing circuit, reproduction data S14 in FIG. 9 is generated as an output of the serial/parallel converting circuit of each of the circuit blocks 67A to 67H. In this case, as outputs of the switching circuits 72A to 72D, as shown in FIG. 9, reproduction data in which the reproduction data of two channels are respectively located in the former and latter halves of the period T is generated. Further, as outputs of outer code decoders of the circuit blocks 73A to 73D, a time division multiplex signal in which two channels are alternately located on a sample unit basis is generated. Although the magnetic heads reproduce the data even after the timings shown in FIG. 9, FIG. 9 shows processes of only the video data which is reproduced by one rotation of the drum for simplicity of explanation.

In the reproducing circuit of the embodiment, on the output side of the switching circuit 72A to 72D, it is sufficient to provide a processing circuit with as few as four channels. The circuit scale can be remarkably reduced as compared with the construction which needs a processing circuit of eight channels.

According to the invention, in order to reduce the drum diameter, relative speed, and the like, the magnetic tape is wrapped around the peripheral surface of the rotary drum by 180° or more, so that a time-dependent overlap occurs in the scanning periods of the magnetic heads. According to the invention, however, by using the time base converting process, it is sufficient to provide recording circuits or reproducing circuits of a number which is smaller than the number of recording heads, and the circuit scales can be reduced.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A recording apparatus for recording a digital video signal on a magnetic tape, comprising:

N magnetic heads in two groups attached to a rotary drum at an angular interval of 180 degrees;

said magnetic tape being wrapped around a peripheral surface of said rotary drum in an angular range where scans of pairs of said N magnetic heads arranged at an angular interval of 180 degrees overlap;

head interleave means for distributing an input digital video signal to a plurality of channels of a number which is fewer than the number N of said N magnetic heads in which each channel contains two time division multiplexed signals for respective recording by two of said N magnetic heads arranged at an angular interval of 180 degrees;

a plurality of digital recording processing means of a number less than the number N each of which is connected to a respective one of said channels and includes an encoder of an error correction code; and a plurality of memory means of a number which is equal to said number N, a pair of said plurality of memory means being coupled to receive one of said plurality of channels from a respective one of said digital recording processing means and a reading operation from each of said plurality of memory means being executed so as to separate said two time division multiplexed signals into different signals each for connection to a respective one of said two magnetic heads arranged at an angular interval of 180 degrees, so that N recording signals are generated from said plurality of memory means, respectively.

2. A recording apparatus according to claim 1 wherein said plurality of memory means comprises a plurality of FIFO memories.

3. A reproducing apparatus for reproducing a digital video signal from a magnetic tape, comprising:

N magnetic heads in two groups attached to a rotary drum at an angular interval of 180 degrees;

said magnetic tape being wrapped around a peripheral surface of said rotary drum in an angular range where a successive pair of scans of two of said N magnetic heads arranged at an angular interval of 180 degrees overlap;

a plurality of memory means equal in number to N to which reproduction data from said N magnetic heads is respectively supplied for time-base compressing said reproduction data so as to eliminate a time-base fluctuation of the reproduction data and to eliminate a time-dependent overlap of the reproduction data from pairs of said N magnetic heads arranged at an angular interval of 180 degrees;

a plurality of switching circuit means of a number which is fewer than said number N of said magnetic heads and each of which synthesizes output data of a pair of said plurality of memory means and forms reproduction data in a respective one of a plurality of channels of a number equal to said number of switching circuit means fewer than said number N, in which each of said channels contains two time division multiplexed reproduction data signals corresponding respectively to reproduction data of two of said N magnetic heads arranged at an angular interval of 180 degrees;

a plurality of digital reproduction signal processing means of a number equal to said number of switching circuit means fewer than said number N and each including decoders of an error correction code which are coupled to said plurality of switching circuit means, respectively; and a deinterleave circuit for combining said plurality of channels each containing two time division multiplexed reproduction data signals from said plurality of digital reproduction signal processing means and corresponding respectively to reproduction data of two of said N magnetic heads arranged at an angular interval of 180 degrees and producing therefrom the digital video signal.

* * * * *